July 29, 1930.  A. M. GOODLOE  1,771,846
AIR FILTER
Filed Feb. 24, 1928   3 Sheets-Sheet 3
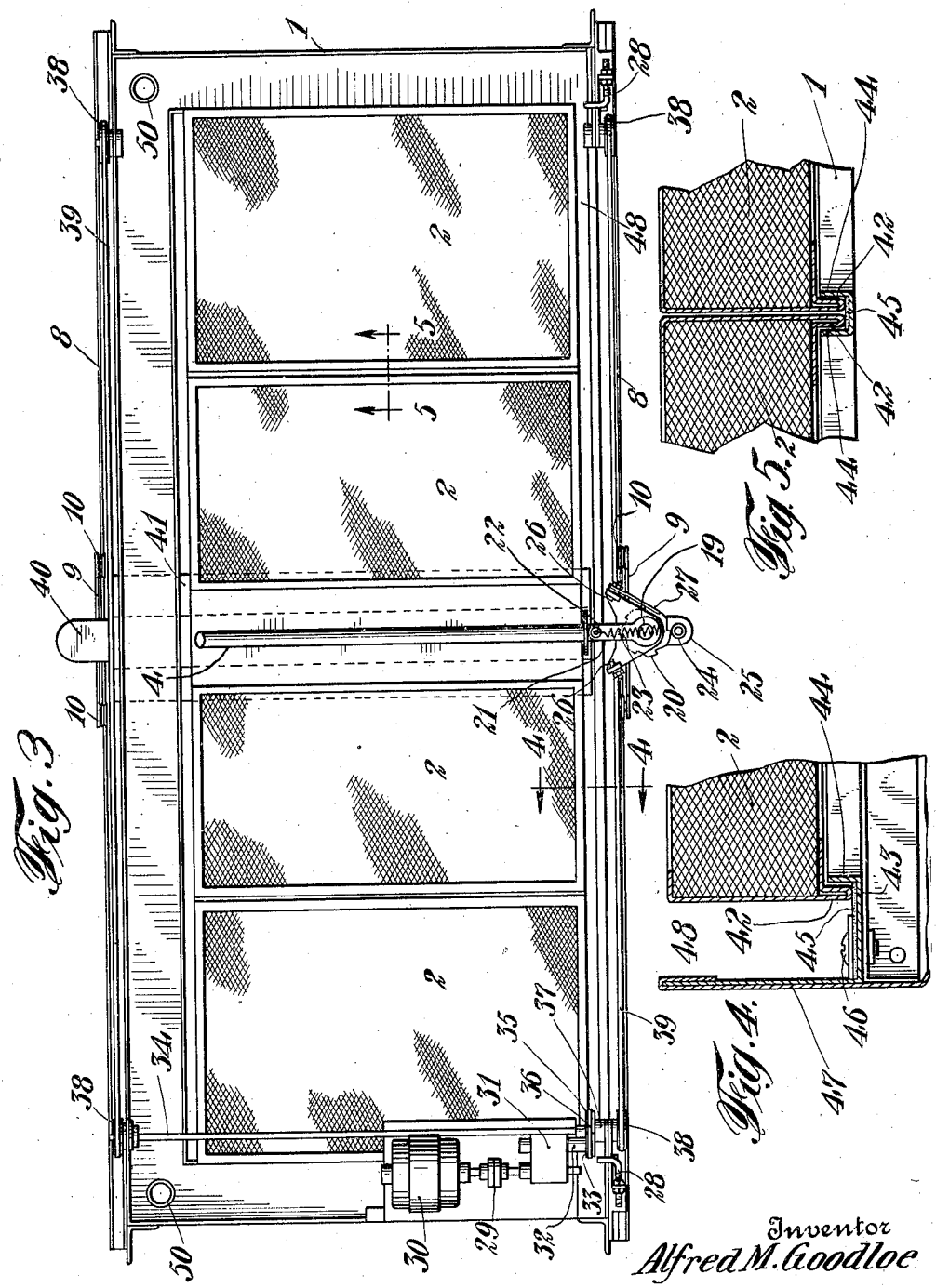

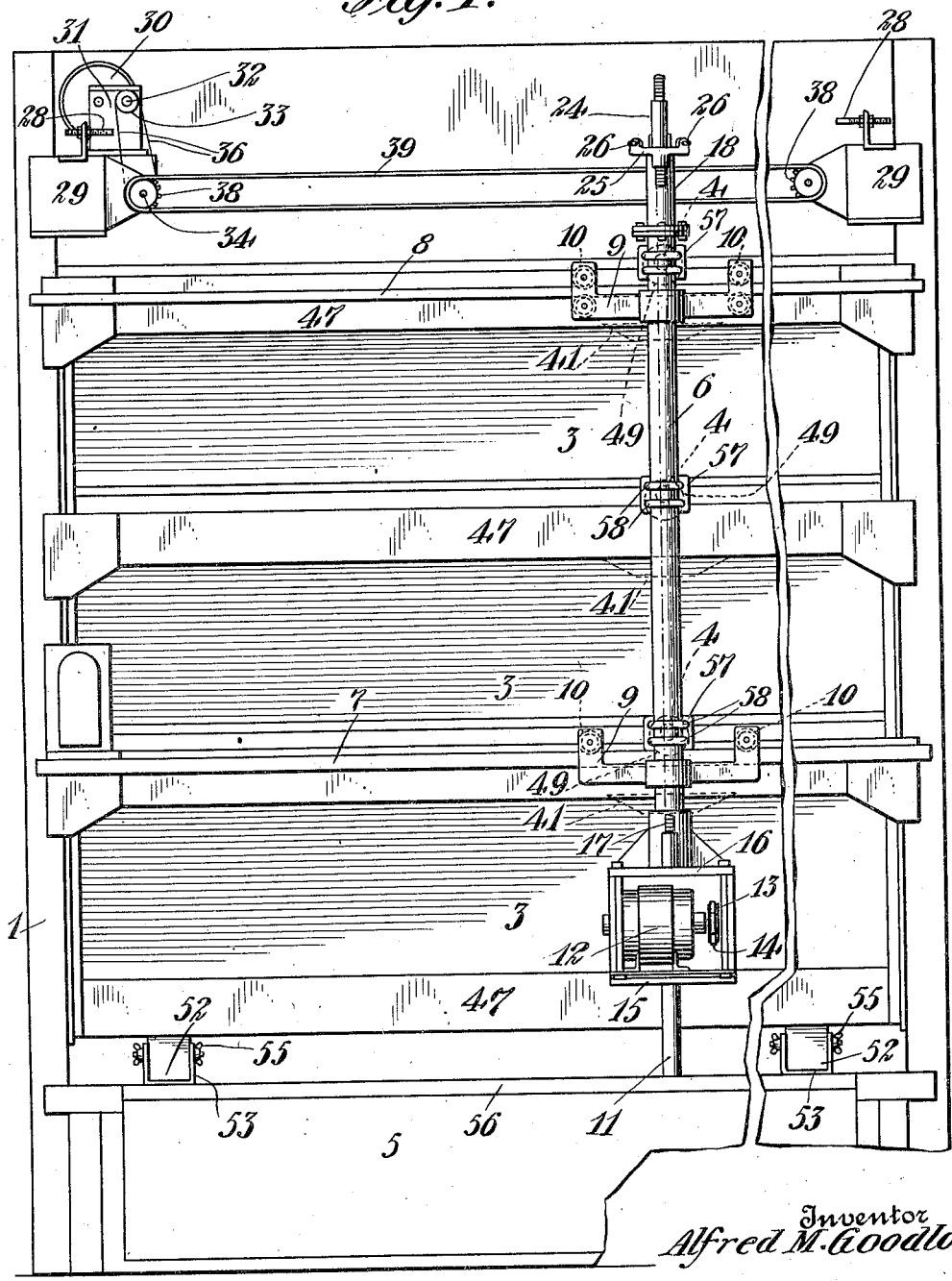

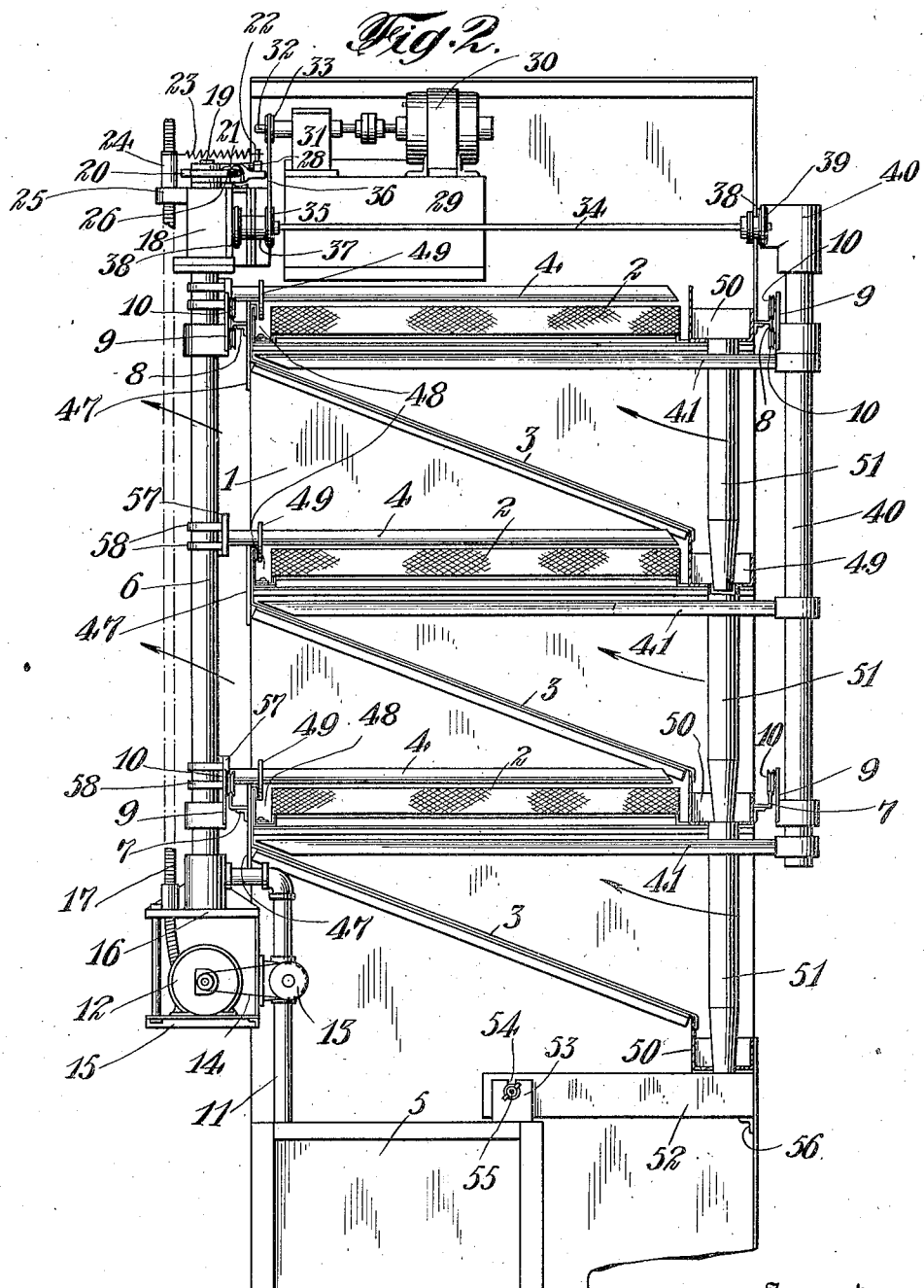

Patented July 29, 1930

1,771,846

UNITED STATES PATENT OFFICE

ALFRED M. GOODLOE, OF BRADFORD, PENNSYLVANIA, ASSIGNOR, BY MESNE ASSIGNMENTS, TO AMERICAN AIR FILTER COMPANY, INC., OF LOUISVILLE, KENTUCKY, A CORPORATION OF DELAWARE

AIR FILTER

Application filed February 24, 1928. Serial No. 256,529.

This invention relates to filters for extracting impurities from air; and particularly filters which can themselves be readily cleaned of dust and the like, with which such filters become charged after a period of use.

An object of my invention is to provide an improved air filter comprising a number of cells or units disposed so that, when air is caused to pass through them, the dust and other particles suspended in the air are screened out; and having parts by which the units or cells of the filter can be purged of the impurities which they arrest and collect, without the operation of the filter having to be suspended or interrupted.

A further object of the invention is to provide a filter comprising a number of cells or units for filtering air, and equipped with devices for flooding and washing the cells or units with a suitable liquid; which is adapted to clean the cells and carry away the foreign particles which have lodged therein. Since, during the time when the flooding is taking place, the operation of the filter is to continue, means are incorporated in the structure containing the invention for shielding the parts by which the flooding is effected. This shielding diminishes or retards the flow of the air at the point where the flooding of the cells is occurring, and thus any danger of the cleaning liquid being carried out of the air filter by the air current is obviated.

Further objects and advantages of the invention are set forth in the following description, taken in connection with the drawings. This disclosure, however, is illustrative only; and I may, of course, vary the construction actually shown, in matters of shape, size and arrangement of the parts, without abandoning the principle of the invention or exceeding the scope of the meanings of the terms in which the appended claims are expressed. On the drawings—

Figure 1 is an end or front view partly in section of a filter built according to my invention;

Fig. 2 is a view seen from the right of Fig. 1;

Fig. 3 is a top view;

Fig. 4 is a section on line 4—4 of Fig. 3; and

Fig. 5 is a section on line 5—5 of Fig. 3.

The same numerals identify the same parts throughout.

The numeral 1 indicates a support or framework carrying a number of filter cells or units 2. The cells or units may have any desired construction; and, generally speaking, they may be in the form of frames of any desired contour; being open at the top and bottom and containing a suitable filtering material through which the air passes. These cells are arranged at different levels in the framework 1; and at each level, there may be a number of cells forming a separate tier. The framework 1 is open from end to end, as indicated in Fig. 2; and below each of the tiers of cells is an inclined deflector plate or apron 3; so placed that when the air flows through the filter from one end to the other, as indicated by the arrows in Fig. 1, it must pass through the tiers of cells 2 from bottom to top and out of the framework at the end opposite to that where it enters. Thus, air flowing into the filter at the right of Fig. 2 must necessarily pass through the tiers of cells 2 before it can leave the filter at the opposite or discharge end at the left. In other words, the plate 3 below each tier of cells fills from top to bottom the space between this tier and the next lower tier through which the air might otherwise pass; and directs the air upward through the tier of cells above it. For each tier of cells, there is a flooding pipe 4 extending across the tier of the cells from one end of the framework to the other, and movable sideways; so that a suitable cleaning fluid, such as oil, or the like, can be discharged over all portions of each tier of cells or units 2 and completely wash the cells, and purge them of dust and foreign particles which lodge in same. This cleaning fluid is drawn from a tank 5 at the bottom of the filter and conducted to the discharge pipes 4 through a vertical header 6, shown as mounted on the framework adjacent the end thereof, at which the filtered air is delivered after passing through the cells 2.

For the purpose of discharging the oil or other cleaning fluid from the different pipes 4 over all parts of the tiers of cells or units 2, and thus wash out the cells thoroughly, the header 6 and the pipes 4 must be movably mounted, so that they can be carried from one side of the framework to the other, as shown in Fig. 1. I, therefore, affix to the framework at the left or delivery end in Fig. 2, a lower rail 7, consisting of two angle pieces, one resting upon the other to provide a single flange; and an upper rail 8 consisting of an angle piece on the support 1 holding a T-bar to provide two flanges. Cross arms 9 are made fast to the header pipe 6 and carry grooved rollers 10, engaging these upper and lower rails; and the rollers 10 on the top cross arm engage both the upper and lower edges of the rail 8. Hence, the header 6 and the supply pipes 4 carried by the header, while free to move sidewise, cannot be lifted or lowered with respect to the framework 1.

The header 6 communicates with the tank 5 through a rigid pipe or connection 11 which extends down into the tank; and mounted adjacent to the lower end of the header 6 and movable therewith is an electric motor 12 which operates a pump 13 in the line of the pipe 11, by belt 14. The pulley of the pump will be of larger diameter than the motor pulley to reduce the speed of the pump. The motor 12 is carried upon a plate 15 secured to a head 16 made fast to the bottom of the header 6, and the numeral 17 indicates a cable in which are housed the conductors of the current for the motor 12. As long as the motor rotates, the cleaning fluid will be drawn up through the pipe 11 and caused to flow into the header 6, from which it issues by way of the flooding pipes 4. The header 6 is provided with valves inside of it, so that communication between this header and the pipes 4 can be controlled; and the operation is such that when the header moves from the left side of the filter with reference to Fig. 1, to the right side, oil will be discharged, say, through the top pipe 4 over the top tier of cells 2; and this top tier will also be flooded when the header moves back from right to left. On the next movement from left to right and back, the next lower tier of cells will be washed; and on the following movement from left to right and back, the bottom tier of cells will be washed. While the washing is being done, the filtering of the air continues, because the flow of the air up through the tiers of cells 2 is not obstructed; but to prevent the oil or other cleaning fluid from being carried by the air out of the filter, it is necessary that all parts of the various cells to which the cleaning fluid is being delivered, be shielded at the time when the cleaning fluid is discharged from the pipes 4 upon them; and the manner in which this shielding is accomplished will be fully described herein later.

The valves in the header 6, as above stated, put the pipes 4 into communication with the interior of the header in succession; so that each tier of cells or units 2 can be washed in turn; and the operation of washing will take place when the header starts at the left of the filter, as shown in Figure 1, and moves over to the right and back again for each tier. The kind of valves which are inside the header 6 and the actuating mechanism therefor, are not a part of this invention, but are fully described and recited in the application of Richard Strindberg for patent on "automatic spray header for horizontal self-cleaning filters," Serial No. 239,358, filed December 12, 1927. These details need not, therefore, be shown and described in this application; since my invention relates particularly to the parts to be hereinafter set forth for screening portions of the cells or units 2 where the cleaning fluid is being discharged from the flooding pipes 4, so that the cleaning fluid will not be taken up by the air and carried along out of the filter. If the cleaning fluid is oily in character, the presence of any oil in the air delivered by it would be very objectionable, because such oil will settle upon the floor and upon other places in the establishment where the filter is set up; and the oil, even though only small quantities or particles were thus carried out of the filter by the air, would be apt to cause stains wherever it is deposited.

The upper end of the header 6 carries a bearing member 18 which has a flange at its lower end to enable it to be secured to a similar flange on the header 6; and inside of the header 6 is a rod 19 which actuates the valves for controlling the communication of the pipes 4 with the header 6. The end of this rod projects from the header 6 through the member 18, and on the upper outer end thereof is a ratchet 20 fixed to the rod 19. This ratchet is actuated by an arm 21 on the upper end of the rod 19. The arm 21 is loosely mounted on the rod 19, and at its outer end, it carries a pin 22. To the pin 22 is attached a spring 23, the other end of which is made fast to a hollow projection 24 on the extended top 25 of the bearing member 18. The cable 17 passes through this projection 24. The purpose of the spring 23 is to hold the arm against one of the stops 26 at each side of the extension 25; and the spring will so act whenever the pin 22 is out of line with the center of the rod 19 and the projection 24. The arm 21 carries a pawl to engage the ratchet 20 and attached to one stop 26 is a spring 27 which holds the ratchet against movement, except when the arm 21 turns the ratchet by means of the pawl above mentioned, which is not shown on the drawing. Adjacent either side of the framework 1 at the end of the range of movement of the header 6 and pipes 4 will be stops 28.

When the header and pipes 4 move to the left, the arm 21 will strike the stop 28 at the left, as shown in Figs. 1 and 3, so that the arm 21 will be thrown over against the right stop 26. At this time, the ratchet 20 will be turned to move the rod 19 and the valves in the header 6, which are rotary valves, to put one of the pipes into communication with the header, for example, the upper pipe 4. When the header has moved to the right far enough, the other stop 28 strikes the arm 21 and moves it over against the left hand stop 26. At this time, the ratchet 20 does not turn, but is held by the spring 27. Therefore, the rod 19 and valves in the header 6 do not move and the flooding pipe 4 for the upper tier remains in communication with the header 6, so that the upper tier of cells 2 continues to be flooded on the return movement of the header and pipes 4 to the left. When the return movement to the left is finished, the stop 28 thereat again engages the arm 21 and throws it over against the right hand stop 26 of the extension 25; thus the rod 19 and the valves are turned to interrupt the communication between the top pipe 4 and the header 6 to establish communication between the next pipe 4 below and the header 6, so that the next lower tier of cells too can be washed. This mode of operation takes place with each pipe 4 in succession, and by this time, the lowermost pipe 4 has washed the lowermost tier of cells 2, the uppermost pipe 4 is ready to be put into communication with the header 6 again to repeat the operation. The header 6 and pipes 4 are carried from one side to the other of the filter by means of suitable mechanism shown as mounted at the upper part of the filter to the left in Figs. 1 and 3. At this point is a bracket 29 which mounts an electric motor 30 connected through speed reduction gearing 31 with a shaft 32 which carries a gear 33. This gear may be a chain gear and is connected to turn shaft 34 carrying a similar gear 35 and sprocket chain 36 connecting this gear with the gear 33. Of course, a belt could be used in place of the sprocket chain 36, and pulleys in place of the wheels 33 and 35, if desired. The shaft 34 is mounted in a bearing 37 and extends through this bearing and carries a chain gear 38. A similar chain gear 38 is mounted at the opposite side of the filter and the two gears 38 are connected by a chain 39. I couple the bearing member 18 to the chain 39, and thus, as the chain moves, it carries the header 6 and pipes 4 first to the right and then back, the movement being repeated continuously, as long as current flows to the motor 30. The coupling may be of any desired construction, but in practice, the member 18 is provided with a vertical slot on the side adjacent the chain 39, and one of the links of the chain will carry a roller which engages the slot. The roller can move up and down in the slot as the link carrying the roller passes from the upper half of this endless chain 39 over one of the wheels 38 to the lower half. Thus, the header and the pipes 4 are moved back and forth in the required manner.

All of the construction which is shown in outline on the drawings of this application for turning the rod 19 and the valves in the header to enable the pipes 4 to discharge in succession upon the cells 2, together with the motor 30 and the connections for moving the header 6 and pipes 4 back and forth, is described and claimed in full in the application of Strindberg above mentioned, and no further account thereof or illustration of same is here needed.

At the opposite side or end of the filter where the air enters before passing through the cells 2, I mount a vertical supporting member 40 which may carry the shields 41 for the flooding pipes 4. This member 40 is shown as movably mounted at the right end of Fig. 2 and it carries arms 9 with rollers 10 to engage rails 7 and 8, similar to the same parts already described in connection with the header 6, so that this member 40 can also move back and forth in time with the header 6. To produce such arrangement, the shaft 34 is extended from the left end of the filter to the right end with reference to Fig. 2 and there mounted in a similar bearing, so that it can carry a gear 38 affixed thereto, similar to the gear 38 already described. Over this gear 38 will likewise pass an endless chain 39; the opposite end of the loop of which passes over an idler gear 38 at the other side of the filter. See Fig. 3. The top of the member 40 can be coupled to the chain in the same manner as the bearing member 18. Thus, the operation of the motor will cause both the header 6 and member 40 to move back and forth from one side of the filter to the other together. This member 40 will be in the same vertical plane at the pipes 4 and header 6, and the screens 41 will be in such position as to extend beneath the tiers of cells 2 as far as the plates 3 will permit. The screens may be attached to the member 40 by means of collars or any other suitable means. These screens as indicated in Fig. 1 will be of sufficient width to extend beyond the sides of the pipes 4 as far as necessary, so that while the filter continues in operation when the washing of the cells 2 is accomplished, each pipe 4 as it floods the tier of cells 2 immediately below it will be shielded from the air current flowing up through that tier, so as to allow the cleaning fluid to permeate the contents of the cells and prevent the cleaning fluid from being caught by the air as it issues from the top of the tier of cells 2 and blown out of the filter.

As stated above, each of the cells 2 may consist of a closed frame containing a suitable filtering material. The frames may be made of stamped metal and the edges of the sides may be extended downward below the bottoms, as indicated at 42 in Figs. 4 and 5. On the support 1 are shelves 43, the outer edges of which are turned upward, as indicated at 44, and on these shelves 43 are placed gaskets of felt 45 which may be secured in place by strips of metal 46 held by bolts or the like. The rims 42 around the bottom of each cell or unit 2 will rest upon the gaskets 45 which act as seals, and the rim 44 around the edges of the shelves will be within the rim 42 of each cell. Thus, no air can pass between the cells 2 and the supporting shelves 43, but must pass through the contents of the cell.

At the delivery end of the filter, cross plates 47 are mounted on the support 1 adjacent each tier of cells, being separated from the adjacent end of the tier by a space or slot 48. On each pipe 4, I may mount an extra shield 49 which may be circular or have any other shape, and be large enough to arrest any particles of cleaning fluid that may be deposited on the pipe 4. If any of the air passing through the cells 2 should blow some of the fluid along this pipe to the left with reference to Fig. 2, this fluid cannot be carried by the air out of the filter, because the shields 49 would obstruct its further flow at the points where they are located.

As the cleaning fluid is delivered by the pipes 4 to the cells 2, it permeates the filtering materials in these cells, passes downward and drops upon the deflector plates 3, washing the dust and other impurities out of the cells 2. The plates 3 permit the cleaning fluid to be drawn down into troughs 50 at the lower end of these plates and at the end of the filter where the air enters. The upper troughs 50, communicate by means of pipes 51 with the lower troughs, so that the contents of the troughs 50 can run downward and be returned to the tank 5. Each of the pipes 51 will be secured to the bottom of one trough, and its lower end will discharge into the pipe 51 of the trough beneath it. Below the lowermost trough 50 are two troughs 52 which carry the cleaning fluid back into the tank 5. These troughs 52 rest in the bearings 53, the sides of which are slotted at 54, and the troughs 52 have threaded projections carrying the wing nuts 55, so that the ends of these troughs can be adjusted up or down. At their ends under the lowermost trough 50, these troughs 52 will rest upon an angle iron 56 of the support 1.

The flooding pipes, are secured to the headers by means of couplings comprising saddles 57 and clamping members 58.

With this invention, to clean the filter, the operator merely switches on the current for the motors 12 and 30; and the operation of the filter is not interrupted during cleaning. The motors are stopped when the cleaning is finished.

The screens 41 are of course continuous and the term "screen" is used in the sense of shield, to give the effect above set forth.

Claims:—

1. In combination with an air and gas filter including a plurality of spaced filtering mediums, and means for causing a flow of air through the respective filter mediums in one direction; means for cleaning the filter mediums including means operating progressively throughout the area of each filtering medium to direct a cleaning fluid upon a comparatively limited portion of the filtering medium in a direction opposite to the direction of air flow, and means for shielding the discharged cleaning fluid against impingement of the air current thereon while permitting of the free passage of air through the remaining portions of the filter mediums.

2. In combination with an air and gas filter including a plurality of spaced filtering mediums, and means for causing a flow of air through the respective filter mediums in one direction; means for cleaning said filtering mediums without interruption in the passage of air therethrough, said means including cleaning fluid discharge pipes extending over one side of the respective filter mediums to discharge the cleaning fluid upon a minor portion of the area thereof, means for progressively moving said pipes over the entire area of the respective filter mediums, and additional means preventing impingement of the air currents upon the cleaning fluid discharged from the respective pipes while permitting of the unobstructed flow of air through the remaining portions of the filter mediums.

3. In combination with an air and gas filter including a plurality of spaced filtering mediums, and means for causing a flow of air through the respective filter mediums in one direction; means for cleaning said filtering mediums without interruption in the passage of air therethrough, said means including cleaning fluid discharge pipes extending over one side of the respective filter mediums to discharge the cleaning fluid upon a minor portion of the area thereof, means for progressively moving said pipes over the entire area of the respective filter mediums, additional means preventing impingement of the air currents upon the cleaning fluid discharged from the respective pipes while permitting of the unobstructed flow of air through the remaining portions of the filter mediums, and means for feeding the cleaning fluid under pressure from a common source of supply to said discharge pipes.

4. In combination with an air and gas filter including a plurality of spaced filtering mediums, and means for causing a flow of air through the respective filter mediums in one direction; means for cleaning said filtering mediums without interruption in the passage of air therethrough, said means including cleaning fluid discharge pipes extending over one side of the respective filter mediums to discharge the cleaning fluid upon a minor portion of the area thereof, means for progressively moving said pipes over the entire area of the respective filter mediums, a member arranged at the opposite side of each filter medium and in the same plane with the respective fluid discharge pipes to prevent impingement of the air currents upon the fluid discharged from said pipes while permitting of the free flow of air through the remaining portions of the respective filter mediums, and means for mounting and supporting said members for movement as a unit with said fluid discharge pipes relative to the filter mediums.

5. In combination with an air and gas filter including a plurality of spaced filtering mediums, and means for causing a flow of air through the respective filter mediums in one direction; cleaning means for said filter mediums including a cleaning fluid discharge pipe extending over one side of each filtering medium to discharge a cleaning fluid upon a comparatively limited portion of the area of said medium, a supply header arranged at one side of the filter and with which said discharge pipes are connected, means for mounting said header for traveling movement relative to the filter whereby the discharge pipes may be progressively moved over the entire area of the respective filter mediums, members arranged at the other sides of the respective filter mediums with relation to said discharge pipes and in the plane of the latter to prevent impingement of the air currents upon the fluid discharge from said pipes, means for supporting said members at the opposite side of the filter for traveling movement relative thereto, and means for reciprocating the header and supply pipes and said members as a unit relative to the filter mediums.

In testimony that I claim the foregoing as my invention, I have signed my name hereto.

ALFRED M. GOODLOE.